(12) United States Patent
Shinoyama

(10) Patent No.: US 12,270,704 B2
(45) Date of Patent: Apr. 8, 2025

(54) PULSED-LIGHT SPECTROSCOPIC DEVICE

(71) Applicant: Ushio Denki Kabushiki Kaisha, Tokyo (JP)

(72) Inventor: Kazuki Shinoyama, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 237 days.

(21) Appl. No.: 18/022,719

(22) PCT Filed: Oct. 14, 2021

(86) PCT No.: PCT/JP2021/038097
§ 371 (c)(1),
(2) Date: Feb. 22, 2023

(87) PCT Pub. No.: WO2022/085568
PCT Pub. Date: Apr. 28, 2022

(65) Prior Publication Data
US 2023/0314216 A1   Oct. 5, 2023

(30) Foreign Application Priority Data
Oct. 21, 2020   (JP) ................. 2020-176848

(51) Int. Cl.
*G01J 3/10*   (2006.01)
*G01J 3/02*   (2006.01)
(Continued)

(52) U.S. Cl.
CPC ............... *G01J 3/10* (2013.01); *G01J 3/0218* (2013.01); *G01J 3/1895* (2013.01);
(Continued)

(58) Field of Classification Search
None
See application file for complete search history.

(56) References Cited

U.S. PATENT DOCUMENTS 3,925,727 A * 12/1975 Duguay ............... G02B 6/2861
250/227.12
2010/0309480 A1   12/2010 Furusawa et al.
(Continued)

FOREIGN PATENT DOCUMENTS

JP   08-125073 A   5/1996
JP   2003-139619 A   5/2003
(Continued)

OTHER PUBLICATIONS

International Searcy Report for PCT/JP2021/038097, Mailed on Jan. 11, 2022.

*Primary Examiner* — Marcus H Taningco
(74) *Attorney, Agent, or Firm* — Yoshida & Associates LLC; Kenichiro Yoshida

(57) ABSTRACT

The pulse width of light from a pulsed light source 1 is stretched by a stretching element 2 such that an elapsed time and the wavelength of the light in the pulsed light correspond to each other on a one-to-one basis, and the stretched light radiates to an object S. The output of a light receiver 4 that has received light from the object S is digitized by an AD converter 6 and the digitized signal is supplied to a calculation means 5. A trigger signal generated by a trigger signal generator 7 in response to the rise of the pulsed light is delayed by a trigger delay section 74 and supplied to the AD converter 6 after the completion of a dead time T3.

8 Claims, 8 Drawing Sheets

(51) Int. Cl.
*G01J 3/18* (2006.01)
*G01N 21/359* (2014.01)
*G02F 1/365* (2006.01)

(52) U.S. Cl.
CPC ........... *G01N 21/359* (2013.01); *G02F 1/365* (2013.01); *G01N 2201/06113* (2013.01)

(56) References Cited

U.S. PATENT DOCUMENTS

| | | | |
|---|---|---|---|
| 2014/0340634 A1* | 11/2014 | Kuranov | A61B 3/14 |
| | | | 351/206 |
| 2017/0122806 A1* | 5/2017 | Capelle | H01S 3/08086 |
| 2018/0045571 A1* | 2/2018 | Shiozawa | G01J 3/0237 |
| 2022/0170791 A1 | 6/2022 | Yamada et al. | |
| 2022/0187126 A1* | 6/2022 | Yokoyama | G02F 1/365 |
| 2022/0276153 A1* | 9/2022 | Sahara | G02F 1/3528 |
| 2024/0027332 A1* | 1/2024 | Yamada | G01N 21/31 |

FOREIGN PATENT DOCUMENTS

| | | | | |
|---|---|---|---|---|
| JP | 2009-273550 A | 11/2009 | | |
| JP | 2013-205390 A | 10/2013 | | |
| WO | WO-2020075442 A1 * | 4/2020 | ........... | G01J 3/0208 |
| WO | 2020/196689 A1 | 10/2020 | | |

\* cited by examiner

FIG. 3

| TIME IN PULSE | WAVELENGTH | REFERENCE SPECTRUM DATA | MEASUREMENT VALUE | ABSORPTION SPECTRUM |
|---|---|---|---|---|
| $t_1$ | $\lambda_1$ | $V_1$ | $v_1$ | $v_1/V_1$ |
| $t_2$ | $\lambda_2$ | $V_2$ | $v_2$ | $v_2/V_2$ |
| $t_3$ | $\lambda_3$ | $V_3$ | $v_3$ | $v_3/V_3$ |
| . | . | . | . | . |
| . | . | . | . | . |
| . | . | . | . | . |
| $t_{n-2}$ | $\lambda_{n-2}$ | $V_{n-2}$ | $v_{n-2}$ | $v_{n-2}/V_{n-2}$ |
| $t_{n-1}$ | $\lambda_{n-1}$ | $V_{n-1}$ | $v_{n-1}$ | $v_{n-1}/V_{n-1}$ |
| $t_n$ | $\lambda_n$ | $V_n$ | $v_n$ | $v_n/V_n$ |

PULSED-LIGHT SPECTROSCOPIC DEVICE

TECHNICAL FIELD

The present disclosure relates to a pulsed-light spectroscopic device that performs spectroscopic measurement using correspondence between a time and a wavelength in a pulsed light.

BACKGROUND ART

A typical pulsed light source is a pulsed oscillation laser (pulsed laser). In recent years, study for broadening the wavelength band of a pulsed laser has been extensively conducted, and typically focuses on the generation of supercontinuum light (hereinafter, referred to as SC light) by utilizing a nonlinear optical effect. The SC light is obtained by allowing light from a pulsed laser source to pass through a nonlinear element, such as a fiber, and broadening the wavelength band using nonlinear optical effects such as self-phase modulation or optical soliton.

CITATION LIST

Patent Literature

Patent Literature 1: JP-A-2013-205390

SUMMARY OF INVENTION

Technical Problem

The above-described broadband pulsed light is stretched in the wavelength region but leaves the pulse width (time width) unchanged as is similar to that of an input pulse used for the generation of the SC light. However, it is possible to stretch the pulse width as well by utilizing a group delay in a transmission element such as an optical fiber. In such a case, selecting the element having suitable wavelength dispersion characteristics is capable of stretching a pulsed light in a state where a time (elapsed time) and a wavelength in the pulsed light correspond to each other on a one-to-one basis.

It is possible to effectively utilize the correspondence between a time and a wavelength in this pulse-stretched broadband pulsed light (hereinafter referred to as broadband stretched pulsed light) for spectroscopic measurement. In other words, when a photodetector receives broadband stretched pulsed light, a temporal change in light intensity detected by the photodetector corresponds to the light intensity of each wavelength, that is, a spectrum. Hence, a temporal change in output data from the photodetector can be converted into a spectrum, which enables spectroscopic measurement without using a special dispersive element such as a diffraction grating. Accordingly, it is possible to determine spectral characteristics (for example, spectral transmittance) of an object by irradiating the object with broadband stretched pulsed light, receiving light from the object with a photodetector, and measuring a temporal change in the light.

Such a spectroscopic measurement utilizing the correspondence between a time and a wavelength in a pulsed light (hereinafter referred to as "pulsed-light spectroscopy") only involves irradiating an object with several pulses (theoretically, even one pulse is possible) and receiving light from the object with a photodetector. Hence, this spectroscopic measurement is expected to perform measurement at very high speed, for example, the entire inspection of products in inspection lines in real-time by means of spectroscopic measurement. In addition, the wavelength resolution can be enhanced by reducing $\Delta\lambda/\Delta t$ with optimizing the pulse stretching. Furthermore, it is also possible to achieve measurement with high signal-to-noise ratios by averaging (or accumulating) the output from the photodetector while irradiating an object with multiple pulses.

Unfortunately, despite these expected advantages, it has been found that the pulsed-light spectroscopy has some specific problems. One of them is a problem in data acquisition. The pulsed-light spectroscopy uses a high-speed photodetector such as a high-speed photodiode of approximately 1 GHz to 10 GHz to convert the elapsed time in the pulse into the wavelength. This requires the output data to be digitized at high speed as well for arithmetic processing, hence the output of the photodetector (analog signal) is converted to digital signals by high-speed AD converters.

High-speed AD converters used for such applications start sampling analog signals upon the input of a trigger signal and digitize the analog signals that have been acquired in an acquisition period longer than the sampling period. During the digitization processing, no additional trigger signal is accepted, thus no analog signal is input during this period, and no analog signal is digitized during this period. The period during which no analog signal is allowed to be input, in other words, the period after finishing an acquisition period and until the next acquisition becomes possible (until the beginning of the next acquisition period) is called a dead time. High-speed AD converters tend to have a very long dead time because many samples need to be digitized due to a high sampling rate (sampling frequency).

A dead time also occurs in oscilloscopes (digital oscilloscopes), which are considered to be AD converters in a broad sense. Oscilloscopes have a period after acquiring data in a certain acquisition period longer than a sampling period, digitizing the captured data and converting them into a waveform, and until a time when the next data is allowed to be acquired, that is, a dead time. High-end high-speed digital oscilloscopes tend to have a longer dead time.

The problem of the above-mentioned long dead time can pose a problem of impeding the excellent characteristics of pulse spectroscopy, such as high speed, high resolution, and high signal-to-noise ratios.

The aspect of the present disclosure is made to solve this problem. For a pulsed-light spectroscopic device that obtains results after digitizing an analog signal from a light receiver with an AD converter, it is an object of the present disclosure to reduce the effects of the dead time, and avoid suffering the excellent characteristics of high-speed, high-resolution, and high signal-to-noise ratios.

Solution to Problem

The aspect of the present disclosure relates to a pulsed-light spectroscopic device. The pulsed-light spectroscopic device includes:
  a pulsed light source;
  a stretching element that stretches a pulse width of a pulsed light emitted from the pulsed light source in a manner that an elapsed time and a wavelength in the pulsed light correspond to each other on a one-to-one basis;
  a light receiver that receives light from an object that is irradiated with light from the stretching element;
  a calculation means that processes an output from the light receiver to obtain a measurement result;

an AD converter that converts an analog signal that is output from the light receiver into a digital signal and supplies the digital signal to the calculation means;

a trigger signal generator that generates a trigger signal in response to a rise of the pulsed light from the pulsed light source; and a trigger supply section that supplies the trigger signal that has been generated by the trigger signal generator to the AD converter and that includes a trigger delay section that delays the trigger signal. An amount of delay in the trigger delay section is an amount of delay such that the trigger signal is input to the AD converter prior to the rise of the pulse signal that has been output from the light receiver and has been input to the AD converter when the object is irradiated with the pulsed light that generates the trigger signal.

Advantageous Effects of Invention

The aspect of the present disclosure is capable of reducing the effects of the dead time without suffering the excellent characteristics, such as high speed, high resolution, and high signal-to-noise ratios.

BRIEF DESCRIPTION OF DRAWINGS

FIG. 3 is a schematic diagram illustrating a main part of an example of a measurement program provided in the pulsed-light spectroscopic device.

DESCRIPTION OF EMBODIMENTS

Overview of Embodiments

Figure 1:
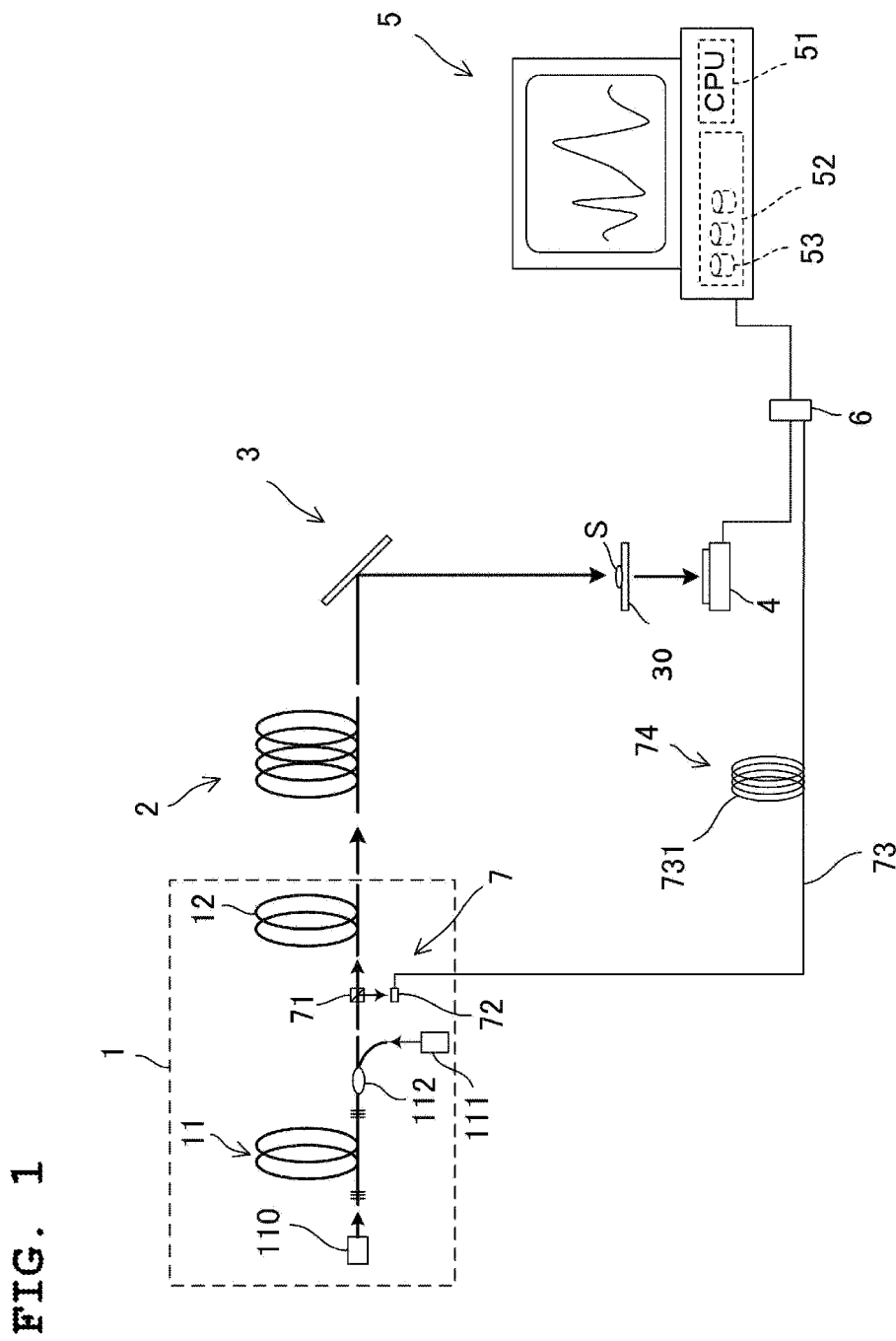
FIG. 1 is a schematic diagram of a pulsed-light spectroscopic device of an embodiment.

Hereinafter, exemplary embodiments for embodying the present disclosure will be described. This overview is intended as a preface to the detailed description that follows, and is described to provide some simplified concepts of one or more embodiments for the purpose of a basic understanding of the embodiments; it is not intended to limit the scope of the invention or disclosure. This overview is not intended to be a comprehensive summary of all possible embodiments, nor is it intended to identify the key elements of all embodiments and to draw the scope of some or all aspects. For convenience, "one embodiment" may be used to refer to one embodiment (Example or Variation Example) or multiple embodiments (Examples or Variation Examples) disclosed in the present specification.

The pulsed-light spectroscopic device according to one embodiment includes:

a pulsed light source that generates a pulsed light;

a stretching element that stretches a pulse width of the pulsed light emitted from the pulsed light source to generate a stretched pulsed light in a manner that an elapsed time and a wavelength in the pulsed light corresponds to each other on a one-to-one basis;

a light receiver that receives light from an object that is irradiated with light from the stretching element;

a trigger signal generator that generates a trigger signal in response to a rise of the pulsed light; and a trigger supply section that delays the trigger signal;

an AD converter that starts acquiring an analog signal that is output from the light receiver in response to the trigger signal that has been supplied from the trigger supply section, and that converts the analog signal into a digital signal;

a calculation means that processes the digital signal that has been generated by the AD converter to obtain a measurement result. An amount of delay in the trigger supply section is an amount of delay such that the trigger signal is input to the AD converter prior to the rise of the pulsed analog signal that has been output from the light receiver when the object is irradiated with the stretched pulsed light associated with the pulsed light that has been used for the trigger signal generator to generate the trigger signal.

This configuration allows the trigger signal that has been delayed by the trigger supply section to be supplied to the AD converter, thereby providing the effects of reducing missed pulses and making the overall measurement more efficient by preventing time and resources from being wasted.

In one embodiment, the pulsed light source may include an ultrashort pulse laser and a nonlinear element that causes laser light emitted from the ultrashort pulse laser to generate a nonlinear optical effect for broadening a wavelength band of the laser light. The trigger signal generator may generate the trigger signal by extracting and detecting a part of the laser light emitted from the ultrashort pulse laser and prior to its incidence onto the nonlinear element.

This configuration makes it easy to generate the trigger signal stably and reproducibly because the trigger signal is generated by capturing a sharply rising pulse. Hence, digitization processing in the AD converter can also be performed stably and reproducibly, enhancing the reliability of the device.

In one embodiment, the trigger signal may be an electrical signal. The trigger supply section may include a trigger delay section that delays the trigger signal. The trigger supply section may include a cable connecting the trigger signal generator to the AD converter. The cable may include a surplus section that has a length longer than that necessary for a spatial separation between the trigger signal generator and the AD converter. The trigger delay section may be the surplus section of the cable.

This configuration provides the effects of enhancing the stability of the amount of delay and the degree of freedom in changing the amount of delay.

In one embodiment, the pulsed-light spectroscopic device may further include a temperature control mechanism that adjusts a temperature of the surplus section.

This configuration provides the effects of suppressing fluctuations in the amount of delay due to the temperature and facilitating intentional changes in the amount of delay because the temperature control mechanism, which adjusts the temperature of the surroundings of the surplus section, is provided.

In one embodiment, the pulsed-light spectroscopic device may further include a dividing element that divides the stretched pulsed light and allows one of the divided light beams to radiate the object, a reference light receiver disposed at a position onto which the other light beam divided by the dividing element is incident without passing through the object, and a reference AD converter that starts acquiring an analog signal that is output from the reference light receiver and that converts the analog signal into a digital signal. The trigger supply section may be configured to also supply the trigger signal to the reference AD converter, and may be configured to delay the trigger signal supplied to the reference AD converter in the same manner as that supplied to the AD converter.

The configuration, in which the trigger signal is also supplied to the reference AD converter in the configuration where the reference light receiver is provided to obtain the reference spectrum data in real-time, provides effects of reducing missed pulses and improving the efficiency of the overall measurement in addition to a highly accurate spectroscopic measurement without being affected by disturbance.

In one embodiment, the pulsed-light spectroscopic device may further include a synchronization means that synchronizes sampling in the AD converter with sampling in the reference AD converter.

This configuration suppresses the reliability of the measurement results from being lowered caused by sampling deviation.

In one embodiment, the stretching element may include an array waveguide diffraction grating that divides the pulsed light into a plurality of light beams corresponding to a plurality of wavelengths and a plurality of fibers that transmit the plurality of light beams that have been divided by the array waveguide diffraction grating.

This configuration makes it possible to optimize the group delay for each wavelength to achieve optimal pulse stretching. This configuration tends to increase the delay of light that is incident onto the light receiver, thereby providing the significance of reducing the missed pulse and useless data acquisition duration.

In one embodiment, the AD converter may have a dead time that is a period of being available for acquiring a next analog signal after finishing acquiring the analog signal. In a repetition period of the pulsed light from the pulsed light source, an interval of the stretched pulsed light is longer than the dead time.

This configuration prevents the missed pulse and is suitable in this respect.

A pulsed-light spectroscopic method according to one embodiment includes the steps of:
generating a pulsed light;
stretching a pulse width of the pulsed light to generate a stretched pulsed light in a manner that an elapsed time and a wavelength in the pulsed light correspond to each other on a one-to-one basis;
detecting light from an object that is irradiated with the stretched pulsed light with a light receiver to generate an analog signal in accordance with an intensity of the received light;
generating a trigger signal in response to a rise of the pulsed light and delaying the trigger signal to supply it to an AD converter;
starting acquiring the analog signal, with the AD converter, that is output from the light receiver in response to the trigger signal that has been delayed, and converting the analog signal into a digital signal; and
processing the digital signal that is generated by the AD converter to obtain a measurement result.

An amount of delay that is given to the trigger signal is an amount of delay such that the trigger signal is input to the AD converter prior to the rise of the pulsed analog signal that has been output from the light receiver when the object is irradiated with the stretched pulsed light associated with the pulsed light that has been used to generate the trigger signal.

Embodiments

Hereinafter, suitable embodiments will be described with reference to the drawings. Identical or similar components, parts, and processes shown in the respective drawings are given the same symbols, and duplicate descriptions will be omitted as appropriate. Note that the embodiments are illustrative rather than restrictive of the disclosure and invention, and all of the features or combinations thereof described in the embodiments are not necessarily essential to the disclosure or invention.

Hereinafter, embodiments for embodying the invention of the present application will be described. FIG. 1 is a schematic diagram of an embodiment of a pulsed-light spectroscopic device. The pulsed-light spectroscopic device shown in FIG. 1 includes a pulsed light source 1 and a stretching element 2 that stretches the pulse width of a pulsed light emitted from the pulsed light source 1. An elapsed time and a wavelength in the pulsed light emitted from the stretching element 2 correspond to each other on a one-to-one basis. The pulsed-light spectroscopic device undergoes spectroscopic measurement using this one-to-one correspondence.

The pulsed light source 1 is a light source that emits the pulsed light having a continuous spectrum. In the present embodiment, for example, the light source emits light having a continuous spectrum over a wavelength width of at least 10 nm in a range of 900 nm to 1300 nm. The "continuous spectrum over a wavelength width of at least 10 nm in a range of 900 nm to 1300 nm" means any continuous wavelength width of 10 nm or more within a range of 900 to 1300 nm. For example, it may be continuous from 900 to 910 nm or may be continuous from 990 to 1000 nm. In addition, it is more preferable that the spectrum is continuous over a wavelength width of 50 nm or more, and it is still more preferable that the spectrum is continuous over a wavelength width of 100 nm or more. In addition, "the spectrum is continuous" means to include the spectrum continuous at a certain wavelength width. This is not limited to the case of being continuous in the entire spectrum of the pulsed light, and may include the case of being partially continuous.

The range of 900 nm to 1300 nm is set because the pulsed-light spectroscopic device of the embodiment is used for spectroscopic measurement in this wavelength region. The light having a continuous spectrum over the wavelength width of at least 10 nm is typically SC light. Hence, in this embodiment, the pulsed light source 1 is an SC light source. However, other broadband pulsed light sources other than an SC light source may be used.

The pulsed light source 1, which is an SC light source, includes an ultrashort pulse laser 11 and a nonlinear element 12. In the present embodiment, a fiber laser provided with a seed laser 110 and a pumping laser 111 is used for the ultrashort pulse laser 11. A pumping laser light (continuous oscillation light) from a pumping laser 111 is introduced into a laser medium (fiber) such as Fiber Bragg Grating (FBG), that is sandwiched between a pair of high-reflection/low-reflection resonance mirrors via a coupling element 112 such as a fiber coupler, and excited. Then a seed laser beam (pulsed oscillation light) from the seed laser 110 is introduced into the laser beam. This causes induced emission in the laser medium, oscillating ultrashort pulse laser light. Other examples of the ultrashort pulse lasers 11 include gain-switched lasers and microchip lasers.

A fiber is often used as the nonlinear element 12. For example, photonic crystal fibers and other nonlinear fibers can be used as the nonlinear element 12. Single-mode fibers are often used as the mode of the fiber; however, multi-mode fibers can also be used as the nonlinear element 12 provided that they exhibit sufficient nonlinearity.

Figure 2A:
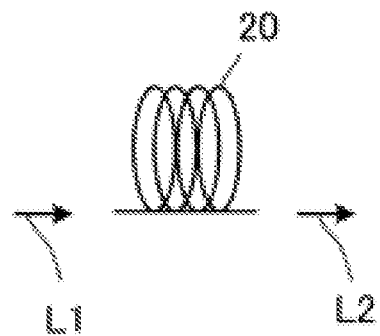
FIGS. 2A and 2B are schematic diagrams illustrating pulse stretching by a stretching element.
Figure 2B:
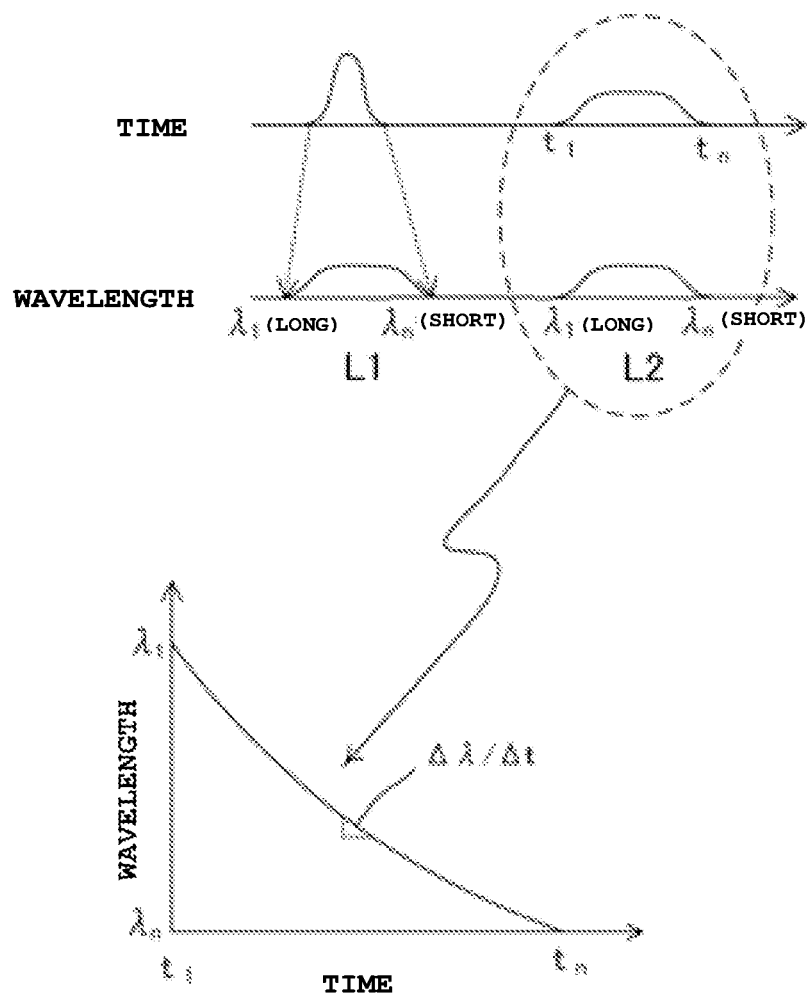

The stretching element 2 is an element that stretches a pulse such that a time and a wavelength of light in the stretched pulse is a one-to-one relationship, as described above. This point will be described using FIGS. 2A and 2B. FIGS. 2A and 2B are schematic diagrams illustrating pulse stretching by the stretching element.

When SC light L1 having a continuous spectrum in a certain wavelength range is made to pass through a group delay fiber 20 having a positive dispersion characteristic in the wavelength range, the pulse width is effectively stretched. As shown in FIG. 2B, although the SC light L1 has an ultrashort pulse, there exists light having the longest wavelength $\lambda_1$ at the beginning of one pulse, light having a shorter wavelength gradually as time elapses, and light having the shortest wavelength $\lambda_n$ at the end of the pulse. When this light is made to pass through the normally-dispersed group delay fiber 20, light having a shorter wavelength propagates with a more delay in the normally-dispersed group delay fiber 20, increasing the time difference in one pulse. Hence, when being emitted from the group delay fiber 20, the light having a shorter wavelength is further delayed as compared with light having a longer wavelength. As a result, SC light L2 emitted becomes light having the stretched pulse width in a state where the uniqueness of time to wavelength is secured. In other words, as shown in the lower side of FIG. 2B, in times $t_1$ to $t_n$, pulse stretching is performed in a one-to-one correspondence with the wavelengths $\lambda_1$ to $\lambda_n$.

It is also possible to use an anomalous dispersion fiber as the group delay fiber 20 for pulse stretching. In this case, the SC light is dispersed in such a state in which the light having a longer wavelength that has existed at the beginning of the pulse is delayed, and the light having a shorter wavelength that has existed at the later time proceeds. Hence, the temporal relationship in one pulse is reversed, and the pulse is stretched in the state in which the light having a shorter wavelength exists at the beginning of one pulse and the light having a longer wavelength exists with the lapse of time. However, as compared with the case of normal dispersion, anomalous dispersion often requires further increase in the propagation distance for pulse stretching, resulting in a larger loss. Hence, normal dispersion is preferable in this respect.

Meanwhile, as shown in FIG. 1, the pulsed light stretched by the stretching element 2 is designed to radiate an object S via an irradiation optical system 3. A holding member is provided to hold the object S at an irradiation position. In the present embodiment, the holding member is a receiving plate 30 because the configuration is such that the object S is irradiated with the pulsed light from the above. In addition, since the device according to the present embodiment is a device for measuring the spectroscopic transmittance characteristic of the object S, the receiving plate 30 is selected to be transmissive to light, and a light receiver 4 is provided at a position for receiving the transmitted light.

The device includes a calculation means 5 as a means of processing the output of light receiver 4 to obtain spectroscopic measurement results. As the calculation means 5, a general-purpose PC is used in the present embodiment. Furthermore, an AD converter 6 is provided between the light receiver 4 and the calculation means 5, and the output of the light receiver 4 is input to the calculation means 5 via the AD converter 6.

The calculation means 5 includes a processor 51 and a memory unit 52 such as hard disks and memory. The memory unit 52 includes a measurement program 53 that processes the output data from the light receiver 4 to calculate the spectrum and other necessary programs. FIG. 3 is a schematic diagram illustrating a main part of an example of the measurement program provided in the pulsed-light spectroscopic device.

The example shown in FIG. 3 is an example of a program in which the measurement program 53 is used to measure an absorption spectrum (spectral absorptance). In the calculation of the absorption spectrum, reference spectrum data is used. The reference spectrum data is a value for each wavelength serving as a reference for calculating the absorption spectrum. The reference spectrum data is acquired by allowing the light from the stretching element 2 to be incident on the light receiver 4 without passing through the object S. In other words, the light is directly incident on the light receiver 4 in a state that no object S is disposed, the output of the light receiver 4 is input to the calculation means 5 via the AD converter 6, and values with an interval of time resolution $\Delta t$ are acquired. Values ($V_1$, $V_2$, $V_3$, ...) are stored as reference intensities at their respective times ($t_1$, $t_2$, $t_3$, ...) with an interval of the time resolution $\Delta t$. The time resolution $\Delta t$ is an amount dependent on a response speed (signal discharge cycle) of the light receiver 4, and represents a time interval with which a signal is output.

The reference intensities $V_1$, $V_2$, $V_3$, ... at their respective times $t_1$, $t_2$, $t_3$, ... are intensities (spectra) of the corresponding wavelengths $\lambda_1$, $\lambda_2$, $\lambda_3$, ..., respectively. The relationships between the times $t_1$, $t_2$, $t_3$, ... and the wavelengths in one pulse are examined in advance, thus the values $V_1$, $V_2$, $V_3$, ... at the respective times are dealt with the values of $\lambda_1$, $\lambda_2$, $\lambda_3$, ....

Then, when the light having passed through the object S is incident on the light receiver 4, the output from the light receiver 4 is, via the AD converter 6, similarly stored in the memory as the values (measurement values) $v_1$, $v_2$, $v_3$, ... of the respective times $t_1$, $t_2$, $t_3$, .... Each measurement value is compared with the respective reference spectrum data ($v_1/V_1$, $v_2/V_2$, $v_3/V_3$, ...) and the result is the absorption spectrum (taking the logarithm of the inverse as appropriate). The measurement program 53 is programmed so as to perform the arithmetic processing as described above.

The following is the description of the AD converter 6, which digitalizes the analog signal from the light receiver 4 and inputs the digital signal to the calculation means 5 performing the above-mentioned processing.

As described above, a high-speed AD converter is used for the AD converter 6. For example, a high-speed (or ultra-high-speed) AD converter with a sampling rate of approximately 1000 MSPS to 10 GSPS can be suitably used, where MSPS is a unit representing the number of samples per second with mega and GSPS is a unit representing the number of samples per second with giga.

As described above, a trigger signal is necessary for the AD converter 6 as a signal that provides the timing to start acquiring analog signals. For this reason, the device of the embodiment includes a trigger signal generator 7.

As mentioned above, the processing in the calculation means 5 is the calculation of light intensity at each wavelength using a time-to-wavelength correspondence in the pulse, hence digitization processing in the AD converter 6 also needs to be performed in each pulse. In other words, the light receiver 4 always outputs analog signals, but the output is essentially zero during the time when no pulse is received, thus the digitization processing of this signal is unnecessary. Hence, it is necessary to supply the AD converter 6 with a trigger signal associated with the pulse generation, which triggers the AD converter 6 to digitize the amplitude of the pulse (output value of light receiver 4) at each sampling period.

For this purpose, provided is the trigger signal generator 7 that generates a trigger signal as pulsed light from the pulsed light source 1 rises. In the present embodiment, the trigger signal generator 7 is provided in the pulsed light source 1 because of the viewpoint of the determination of the pulse generation. The trigger signal generator 7 may be disposed on the output side of the pulsed light source 1, for example, on the output side of the stretching element 2. However, as shown in FIG. 2, it is inevitable that the waveform of the pulse after stretching has a gradual rise. In the case of a pulse with such a gradual rise, it is difficult to determine clearly the time at which the pulse was generated, making it difficult to generate a trigger signal stably and reproducibly. Hence, it is preferable to capture the pulse generation at a stage prior to pulse stretching.

From this viewpoint, in this embodiment, the trigger signal generator 7 is provided in the pulsed light source 1. More specifically, in this embodiment, a part of the output from ultrashort pulse laser 11 is extracted by a beam splitter 71, and the extracted light is detected by a detector 72 to generate a trigger signal. That is, the trigger signal generator 7 is constituted by the beam splitter 71 that extracts a part of the output from the ultrashort pulse laser 11 and the detector 72 that detects the extracted light.

The ultrashort pulse laser light prior to being incident on the nonlinear element 12 has a very steep rise, making it suitable for generating a trigger signal. Alternatively, a part of the seed laser light from the seed laser 110 may be extracted and detected, which can be used to generate a trigger signal. In addition, in a configuration in which no seed laser 110 is used and a pulse-oscillating excitation laser is used to excite the laser medium for outputting ultrashort pulse laser light, the trigger signal may be generated by extracting a part of the output of the excitation laser.

In addition, the trigger signal may also be generated by extracting and detecting a part of the output of the nonlinear element 12. However, since the rise of the pulse can be slowed down during broadening the pulse due to the nonlinear optical effect in the nonlinear element 12, it is preferable to extract the light at the output side of the ultrashort pulse laser 11 (the input side of the nonlinear element 12).

As shown in FIG. 1, the trigger signal generator 7 is connected to the AD converter 6 via a cable 73, which supplies the trigger signal to the AD converter 6. A major feature of the present embodiment is that a trigger supply section that supplies the trigger signal to the AD converter 6 includes a trigger delay section 74 that delays the trigger signal.

The trigger supply section is the cable (hereinafter referred to as the TrADC cable) 73 that connects the trigger signal generator 7 to the AD converter 6. As shown in FIG. 1, in the present embodiment, the trigger delay section 74 is a surplus section 731 of the TrADC cable 73. The term "surplus section" means the portion of the cable that exceeds the length necessary for connection in terms of the spatial separation between the trigger signal generator 7 and the AD converter 6. Thus, the trigger delay section 74 in this example is a section that provides a delay exceeding the delay that inevitably occurs in the required length of the connection between the trigger signal generator 7 and the AD converter 6. The TrADC cable 73 is, more precisely, the cable that connects the detector 72 of the trigger signal generator 7 to the AD converter 6.

For example, a coaxial cable is used as the TrADC cable 73. When a length of, for example, 1 m is sufficient for the connection between the trigger signal generator 7 and the AD converter 6, the portion exceeding 1 m serves as the trigger delay section 74. The TrADC cable 73 has an overall length of 41 m, for example, and thus the portion of 40 m serves as the trigger delay section 74. In this case, since the amount of delay per meter is about 4.5 to 5.5 nanoseconds, the overall amount of delay is approximately 180 to 220 nanoseconds.

Figure 4A:
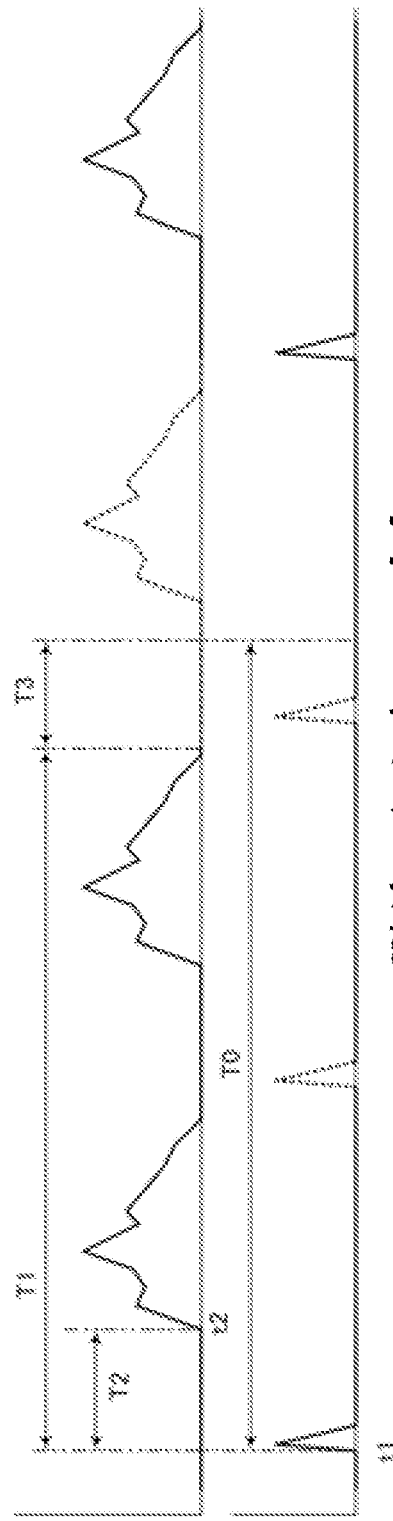
FIGS. 4A and 4B are schematic diagrams illustrating the significance of a trigger delay section in the embodiment of the pulsed-light spectroscopic device.
Figure 4B:
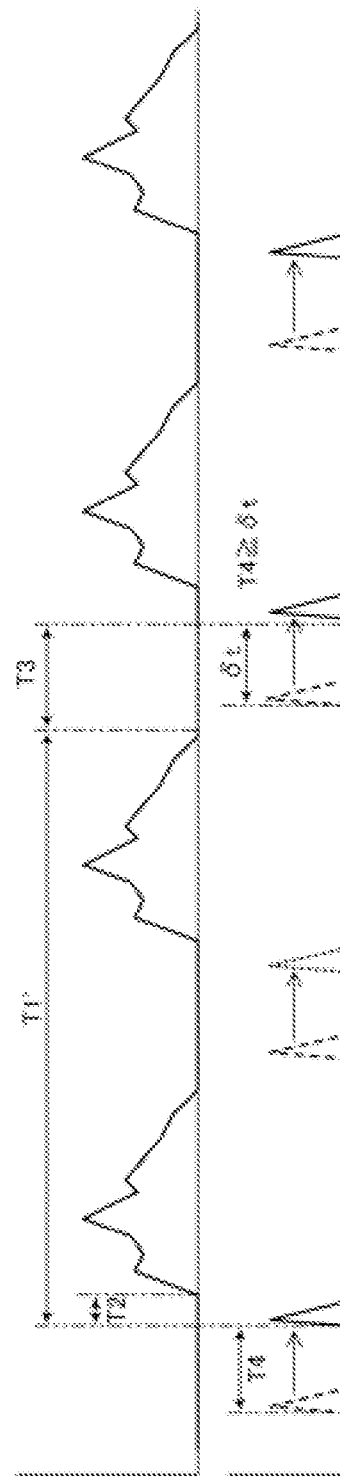

Providing such a trigger delay section 74 is based on the inventor's research conducted to reduce the effects of dead time in the AD converter 6. Hereinafter, this point will be described with reference to FIGS. 4A and 4B. FIGS. 4A and 4B are schematic diagrams illustrating the significance of the trigger delay section in the embodiment pulsed-light spectroscopic device. FIG. 4A illustrates the digitization processing in the AD converter 6 without the trigger delay section 74, and FIG. 4B illustrates the digitization processing in the AD converter 6 with the trigger delay section 74.

In FIG. 4A, the upper row illustrates the analog input (output of light receiver 4) that is input to the AD converter 6, and the lower row illustrates the trigger signal generated by the trigger signal generator 7. The trigger signal is generated at the rise of a pulse, thus the trigger period is essentially the same as the pulse period. T1 is a time length of the analog signal to be converted into a digital signal (so-called data recording length). T0 is a period from the time when a trigger signal has been accepted to the time when the next trigger signal can be accepted. In other words, analog signal acquisition is performed for a length of T1 every T0 period. In the following description, T1 is referred to as an acquisition period.

As shown in FIG. 4A, the rise of the pulse in the analog input does not coincide with the beginning of the acquisition period T1. That is, the pulsed analog signal is acquired with a delay from the beginning of T1. This delay is denoted as T2. The delay T2 corresponds to the time lag of the pulsed light that has been generated by the pulsed light source 1 to be finally acquired by the light receiver 4. Suppose that the pulsed light source 1 generates and emits a pulsed light that rises at a time of t1. As shown in FIG. 4A, the timing of the trigger signal is at the time of t1. This pulsed light reaches the light receiver 4 through the stretching element 2 and the object S, then the analog signal is input to the AD converter 6. The time of the rise of the pulse in the input is t2, which is delayed by T2.

This delay T2 is a delay in acquiring the pulse signal due to the delay of light in the process of passing through the stretching element 2 and the object S. Hereinafter, this delay T2 is referred to as a pulse acquisition delay. In the present embodiment, since the trigger signal is extracted from a part of the output of the seed laser 110, the pulse acquisition delay T2 also includes, strictly speaking, the delay in the ultrashort pulse laser 11 and the delay in the nonlinear element 12.

This pulse acquisition delay T2 causes the analog signals to be acquired substantially zero when the acquisition starts and, the analog signal for the actual pulse begins to be acquired after T2 has elapsed. Then, after the completion of the acquisition in the length of T1, the time of the next trigger signal to be accepted, i.e., the dead time, begins. In FIG. 4A, the period of the dead time is indicated by T3.

Since the acquisition period T1 is set as long as possible, there exist multiple pulsed analog signals in the period of T1. In the present example, two pulses are acquired in one T1. However, in reality, many more pulses are often acquired, and dozens to a hundred pulses may be acquired.

When multiple pulsed analog signals are acquired, after a trigger signal is generated to begin the analog signal acquisition, a trigger signal generated by the next pulse is ignored by the AD converter 6. That is, a trigger signal is ignored not only during the period T3 but also during the period T1 after the starting. The trigger signal that is ignored is indicated by a dashed line in FIG. 4A.

The length of the acquisition period T1 is determined by the number of pulses to be acquired. For example, when five pulses are to be acquired, the length is equal to the sum of the length of the five pulses and the length of four intervals between each pulse. However, since there exists the pulse acquisition delay T2 as shown in FIG. 4A, the T2 is added to the length.

As can be seen from the above description and FIG. 4A, even after the data acquisition is completed in the acquisition period T1, the trigger signal continues to be ignored for the period of the dead time T3. Hence, as shown in FIG. 4A, even when a trigger signal is input during the period of the dead time T3, no data acquisition starts; instead, data acquisition starts at the next trigger signal (i.e., the next pulse). In other words, the pulse corresponding to the trigger signal that is ignored during the period of the dead time T3 is not converted into a digital signal, falling out of the output of the AD converter 6. In other words, the dead time T3 causes the pulses to be missed. In FIG. 4A, the missed pulse is indicated by dashed lines.

In contrast, in the configuration provided with the trigger delay section 74, the trigger signal is delayed before being input to the AD converter 6, as shown in FIG. 4B. The amount of delay is slightly smaller than T2 in FIG. 4A. In FIG. 4B, the amount of delay is indicated by T4. In this case, the pulse acquisition delay T2, which had previously occurred, becomes very short or nearly zero. In other words, since the delay of light itself is unchanged, the timing t2, at which the beginning of the pulse is acquired by the AD converter 6, itself remains unchanged; however, the trigger signal is also delayed in accordance with the delay of light (i.e., t1 becomes later), making the pulse acquisition delay T2 smaller. Since the acquisition period T1 is a length capable of acquiring the desired number of pulses, the amount by which T2 is shortened (amount of delay T4) can be subtracted. That is, T1'=T1−T4.

Note that the dead time T3 itself remains unchanged. That is, it is a fixed length of time beginning at the end of T1' and continuing until the next trigger signal can be accepted. In this case, the trigger signal corresponding to the next pulse after the pulse that has been acquired in the period T1' is similarly delayed by the amount T4. As a result, this trigger signal is in a state of being input after the dead time T3 has been completed and is validly accepted. Therefore, the pulse corresponding to this trigger signal undergoes digitization processing, eliminating the missed pulse.

In this way, the trigger delay section 74 according to the embodiment has significance that the trigger signal is input to the AD converter 6 after the completion of the dead time T3 by making the trigger signal be delayed to the extent of corresponding to the pulse acquisition delay T2 and inputting it to the AD converter 6. Hence, the extent of the delay depends on a difference between the time of the trigger signal occurring during the dead time T3 and the time of the end of the dead time T3 (indicated by δt in FIG. 4A). That is, the delay time T4 of the trigger signal needs to be δt or longer (or longer than δt).

However, if the delay time T4 exceeds the pulse acquisition delay T2 in the case of no delay of the trigger signal (i.e., if T2 is negative), the trigger signal corresponding to the pulse has not been input to the AD converter 6 even though the pulse is actually incident on the light receiver 4, resulting in a situation that the initial data of the pulse is missed. Hence, the delay time T4 needs to be T2 or shorter (or shorter than T2), where T2 is a value in the case of no delay of the trigger signal.

As can be seen from the above description, it can be said that the trigger delay section 74 in the device of the embodiment serves to make the dead time T3 in the AD converter 6 end during the interval of the pulse. Hence, it is desirable to optimize the repetition period of the pulses in the pulsed light source 1 as well. In other words, since a pulse is stretched by the stretching element 2 in the device of the embodiment, the interval of pulsed light at the time of incidence onto the light receiver 4 is shorter than the interval at the time of emission from the pulsed light source 1. Hence, in the case where the length of the interval is shorter than the dead time T3, the missed pulse cannot be reduced to zero even if the trigger signal is delayed by the trigger delay section 74.

In the case where the interval is longer than the dead time, delaying the trigger signal appropriately and setting an acquisition period T1 with an appropriate length can reduce the missed pulse to zero. Hence, it is preferable to set the pulse repetition period and the pulse width after the pulse stretching such that the interval of pulses received at the light receiver 4 is longer than the dead time T3. Specifically, for example, the period of pulse oscillation in the seed laser 110 may be adjusted according to the amount of stretching in the stretching element 2.

Since pulse stretching in the object S is negligible, the interval of pulses at the time of emission from the stretching element 2 can be made longer than the dead time T3. This interval can be determined by placing a light receiver immediately after the stretching element 2 and measuring it.

This configuration of making the interval of pulses longer than the dead time can be effective even when the trigger signal is not delayed. That is, if the interval is equal to or longer than the length of the pulse acquisition delay T2+dead time T3 in the case of not delaying the trigger signal, the trigger delay is unnecessary.

Nevertheless, even when the interval is shorter than the dead time T3, there is still significance in delaying the trigger signal. That is, the period T2 is a period during which the analog signal is started to be acquired but the pulse signal (the substantial measurement signal) is not acquired, which consumes time and resources uselessly. Hence, eliminating or shortening this time will improve the overall measurement efficiency. Also, if multiple trigger signals are present in the dead time T3 in the case of not delaying the trigger signal, it means that multiple pulses will be missed; however, delaying the trigger signal can reduce the missed pulse. In other words, the trigger delay section 74 has the significance of reducing the number of missed pulses even if it may not reduce them to zero.

Accordingly, in the pulsed-light spectroscopic device of the embodiment, delaying the trigger signal that is input to the AD converter 6, which digitizes the analog signal that is output from the light receiver 4, is capable of reducing the missed pulses and improving the measurement efficiency with reducing the waste of time and resource.

A more specific example is described as follows: When the pulsed light source 1 emits broadband pulsed light in the range from 900 to 1300 nm, the pulse width after stretching by the stretching element 2 ranges approximately from 1 to 150 nanoseconds. In this case, the delay of light (pulse acquisition delay T2 in the case of not delaying) is approximately 50 to 200 nanoseconds. The delay time T4 is set to 90% of this T2; thus it is approximately 45 to 180 nanoseconds, for example. In the case of using a coaxial cable, the delay time T4 at this level can be achieved by providing the surplus section 731 having a length of approximately 9 to 36 m.

In practice, the adjustment is made by observing the output of the AD converter 6 on an oscilloscope (or the output of the light receiver 4 on an oscilloscope embedded with the AD converter 6) while varying the delay time T4 appropriately. In other words, T4 is selected to be the longest value in the range where the beginning part of the pulse is not missed. More specifically, the TrADC cable 73 is set to be sufficiently long enough. Initially, the delay time T4 is too long, resulting in missing pulses. Then, the TrADC cable 73 is made shorter by cutting it little by little, and the delay time associated with the length at the point at which the missed pulse no longer occurs is determined to be the delay time T4, and the TrADC cable 73 having the length at that point (including the surplus section 731) is used. If the TrADC cable 73 has a non-negligible loss, an amplifier may be provided to amplify the signal in advance before transmitting the trigger signal.

Figure 5:
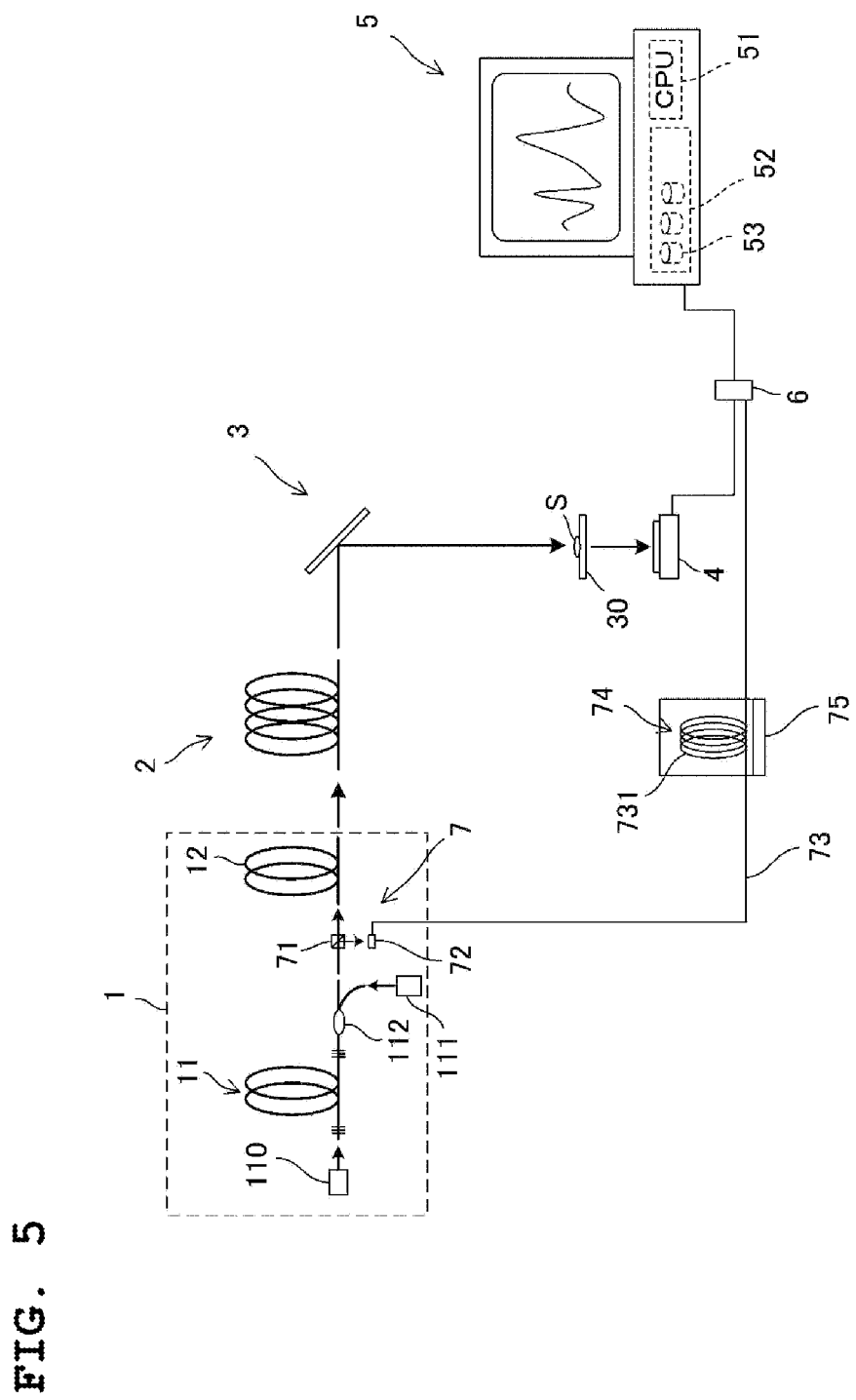
FIG. 5 is a schematic diagram of a pulsed-light spectroscopic device of a second embodiment.

Next, the second embodiment of the pulsed-light spectroscopic device will be described. FIG. 5 is a schematic diagram of a pulsed-light spectroscopic device of a second embodiment. In the second embodiment, the trigger delay section 74 is also provided such that the delayed trigger signal is input to the AD converter 6. Similarly, the trigger delay section 74 is a surplus section 731 of the TrADC cable 73.

In this embodiment, a temperature control mechanism 75 is provided for the trigger delay section 74. As the temperature control mechanism 75, a thermostatic chamber with airtight insertion and extraction holes for the TrADC cable 73 can be used. That is, the temperature control mechanism 75 is a mechanism to keep the temperature of the trigger delay section 74 constant so as not to change.

The TrADC cable 73, which can be a coaxial cable or the like, varies in impedance due to the temperature variation. Even if the impedance variation is negligible, this may cause non-negligible fluctuation in the delay time T4 because the TrADC cable 73 contains a long surplus section 731. The temperature control mechanism 75 has significance in preventing this problem. In other words, it has significance in suppressing the fluctuation of the delay time T4, supplying the trigger signal to the AD converter 6 at a stable timing, and stably providing the effects such as the reduction of the missed pulse.

In addition to keeping the temperature constant, the temperature control mechanism 75 may also actively adjust the temperature to a different value and keep it constant. For example, after having been manufactured and shipped, the pulsed-light spectroscopic device may have some factors that vary the amount of delay of light to vary the delay time T4. Then, it may be necessary to vary the pulse acquisition delay T2 correspondingly. In this case, it is possible to make adjustments such as cutting the TrADC cable 73 slightly or adding a short cable, but it may also be possible to adjust the pulse acquisition delay T2 by changing the temperature. In such cases, the adjustment may be made by changing the preset temperature in the temperature adjustment mechanism 75.

The above-mentioned example of the thermostatic chamber is an example of indirectly adjusting the temperature of the surplus section 731, but it can also directly adjust the temperature. That is, a temperature monitor (e.g., a temperature monitor such that the cable of the surplus section 731 is partially made to be exposed to measure using a non-contact thermometer) may be provided to monitor the temperature of the surplus section 731, and this output may be used to perform feedback control.

Figure 6:
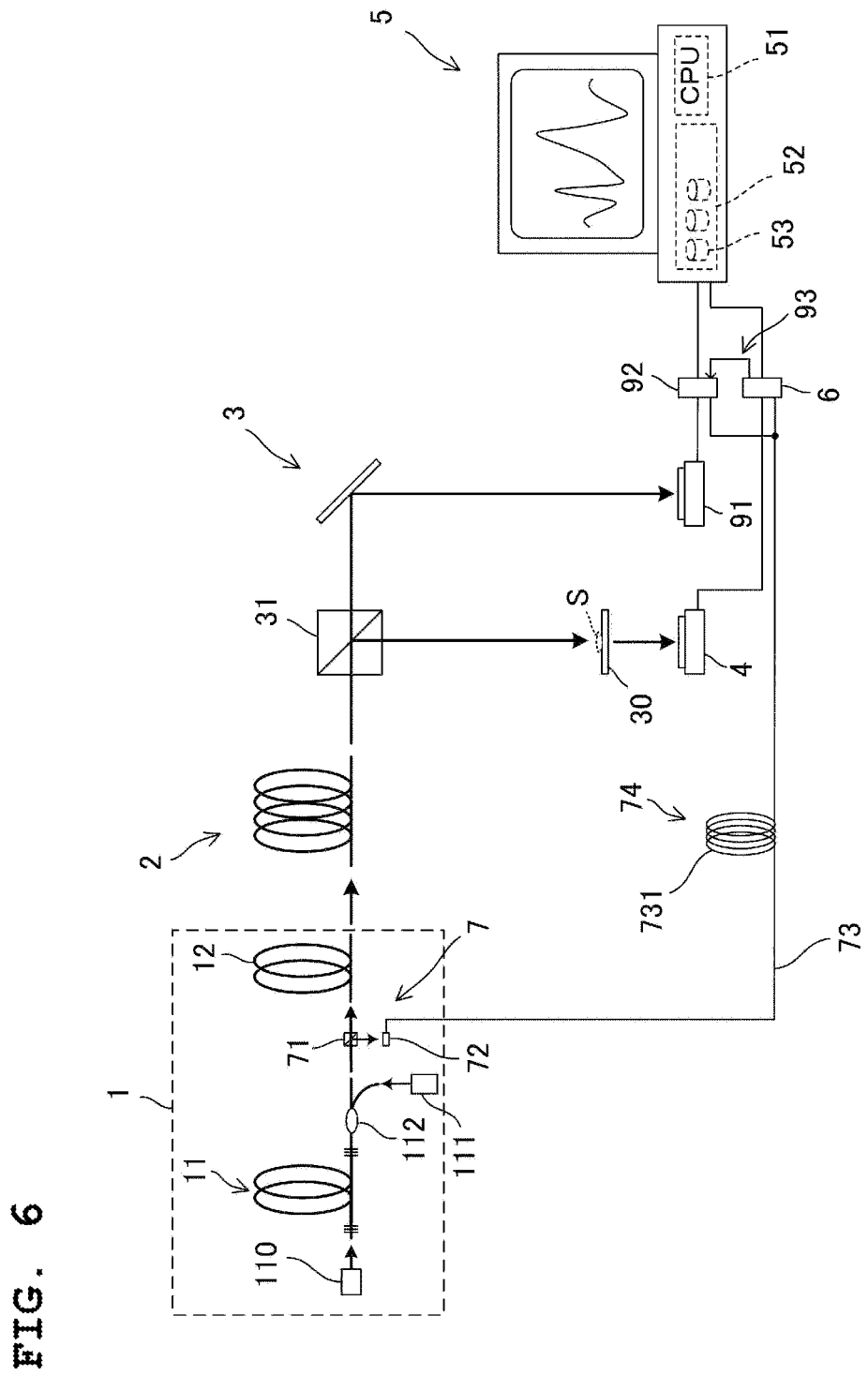
FIG. 6 is a schematic diagram of a pulsed-light spectroscopic device of a third embodiment.

The following is a description of the third embodiment of a pulsed-light spectroscopic device. FIG. 6 is a schematic diagram of a pulsed-light spectroscopic device of the third embodiment.

The pulsed-light spectroscopic device of the third embodiment is configured to acquire reference spectrum data in real-time. Specifically, a dividing element 31 such as a beam splitter is provided on the output side of the stretching element 2. One of the light paths divided by the dividing element 31 extends toward the receiving plate 30 as similar to the respective embodiments described above, and the broadband stretched pulsed light traveling on this light path radiates to the object S. The other optical path, which is divided by the dividing element 31, is a reference optical path. A reference light receiver 91 is disposed along the reference optical path, as shown in FIG. 6.

The reference light receiver 91 is connected to the calculation means 5 via a reference AD converter 92, thus the analog signal is similarly digitized and input to the calculation means 5. The reference AD converter 92 is the same (product with the same specifications) as the measurement AD converter 6.

In this embodiment, the trigger signal generator 7 and the trigger delay section 74 are also provided in the same way. The TrADC cable 73, which includes the surplus section 731 as the trigger delay section 74, branches in the middle into two cables that are connected to the two AD converters 6 and 92 in parallel, as shown in FIG. 6. Hence, similarly delayed trigger signals are designed to be input to the measurement AD converter 6 and the reference AD converter 92. In addition, the length of the TrADC cable 73 from the branch point to the measurement AD converter 6 is the same length of the TrADC cable 73 therefrom to the reference AD converter 92 (or the difference in length is sufficiently small) such that the timing of arrival of the trigger signals does not differ significantly.

As shown in FIG. 6, a synchronization means 93 is provided such that the two AD converters 6 and 92 perform sampling synchronously. In this example, the synchronization means 93 is a means to supply the clock signal of the measurement AD converter 6 to the reference AD converter 92. In other words, the synchronization means 93 is constituted by, for example, the clock signal output section and clock signal transmission line in the measurement AD converter 6.

The output of the reference light receiver 91 is digitized by the reference AD converter 92 and input to the calculation means 5, thus the reference spectrum data is acquired in real-time by the calculation means 5. The processing in the calculation means 5 (processing by the measurement program 53) is basically similar to that in the first and second embodiments.

The pulsed-light spectroscopic device of the third embodiment enables a highly accurate spectroscopic measurement without being affected by disturbance such as changes in the characteristics of the pulsed light source 1 because the reference spectrum data is acquired in real-time. In addition, the periodic measurements for obtaining reference spectrum data (calibration measurements) are no longer necessary. In addition, the delayed trigger signals are also supplied to the reference AD converter 92, thereby avoiding losing the effects of reducing missed pulses. Furthermore, the synchronization means 93 prevents the two AD converters 6 and 92 from being out of synchronization at the time of sampling. If sampling is out of synchronization, the absorptance or the like is calculated based on the reference values at different times (i.e., different wavelengths); however, this embodiment has no such problem, providing a highly reliable pulsed-light spectroscopic device.

The effects of improving the reliability of measurement results due to the synchronization method 93 can be obtained even when the trigger delay section 74 is not provided. In other words, in the case where the pulse acquisition delay T2 is initially small, the trigger delay section 74 may not be provided; however, even in such a case, the synchronization means 93 can serve to improve the reliability of measurement results.

It is also possible to adopt an AD converter with multiple channels (multiple inputs possible) as the AD converter 6, and use one AD converter for measurement and reference. In this case, the same effect as described above can be obtained by using the one with an internal clock synchronization configuration. It is also possible to use the one with the configuration in which a clock generator is separately provided to supply a common clock signal to the two AD converters 6 and 92.

In the embodiments described above, a single fiber (group delay fiber) is described as being used as the stretching element 2, but it is also possible to use multiple fibers, delay the light while dividing and transmitting it, and then combine the divided light beams to irradiate an object S with the combined light. One of the advantages of using multiple fibers is that transmission and pulse stretching of the divided light beams prevent unintended nonlinear optical effects during stretching. The inventor's research has revealed that when light with high energy is transmitted in a single fiber for pulse stretching in order to obtain high output power, nonlinear optical effects are further generated in the fiber for pulse stretching, suffering the uniqueness of time to wavelength. To address this problem, effective is a configuration in which the light from the pulsed light source 1 is divided, and the divided light beams is transmitted through each of the multiple fibers to be stretched by delay.

When light is divided and transmitted through multiple fibers, a configuration in which the light flux is simply divided using a beam splitter or the like is acceptable, but a configuration in which the light flux is divided in accordance with wavelength and transmitted through each fiber for respective wavelengths is more effective. One reason for this is that optimizing the length of the fibers and the material of the fibers in accordance with wavelength is capable of achieving the amount of delay corresponding to the wavelengths. This makes it possible to optimize the amount of pulse stretching as a whole and to achieve a uniform wavelength resolution by making $\Delta\lambda/\Delta t$ uniform across the wavelengths.

Figure 7:
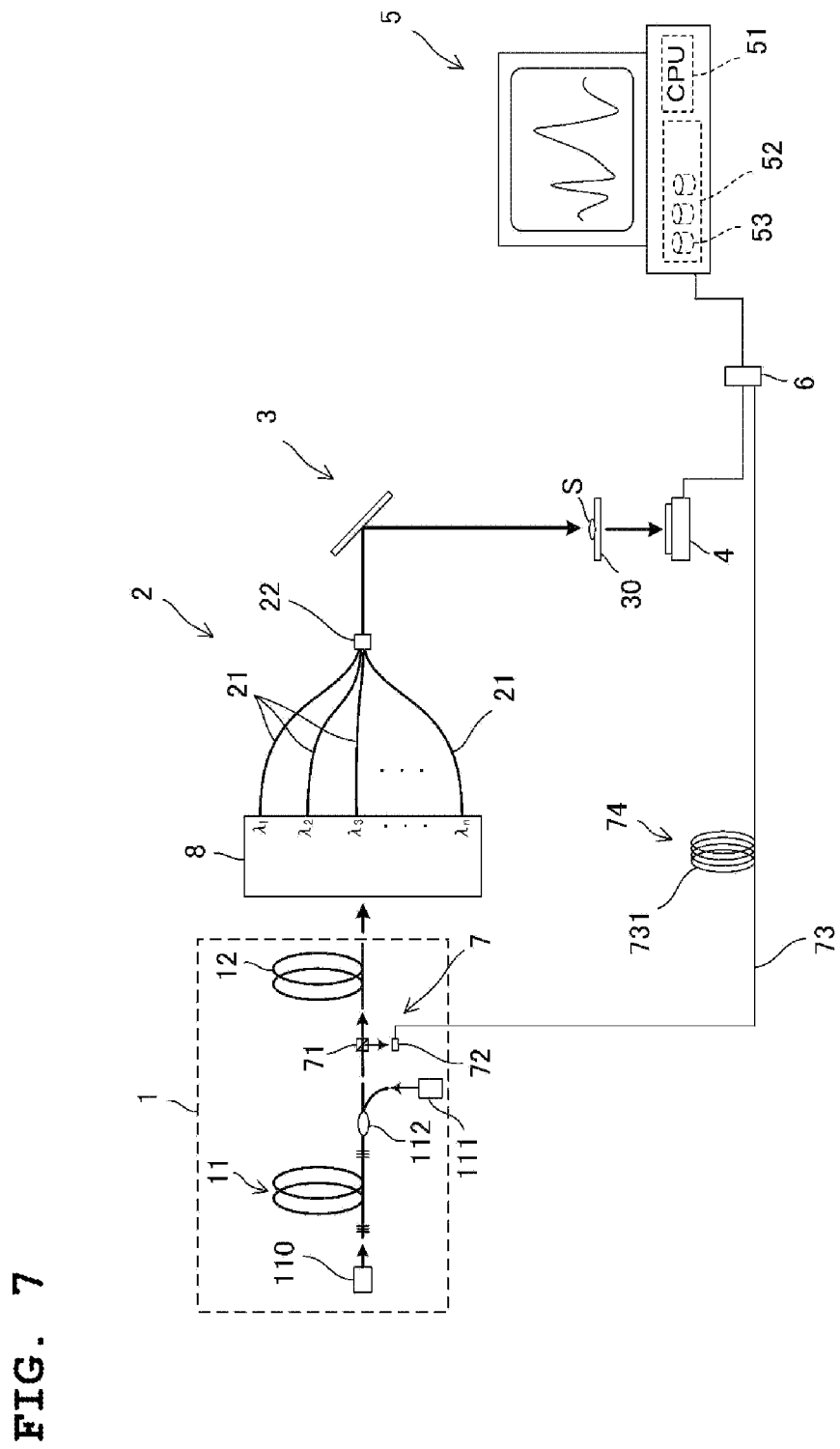
FIG. 7 is a schematic diagram of a pulsed-light spectroscopic device with an array waveguide diffraction grating of a fourth embodiment.

When the light is divided in accordance with its wavelength, an array waveguide diffraction grating (AWG) can be used as the dividing element. FIG. 7 illustrates this embodiment and is a schematic diagram of a pulsed-light spectroscopic device with an array waveguide diffraction grating of a fourth embodiment.

As shown in FIG. 7, an array waveguide diffraction grating 8 is provided, as a dividing element, on the emission side of the pulsed light source 1. The plurality of stretching fibers 21 are provided in parallel, as the stretching element 2, on the emission side of the array waveguide diffraction grating 8.

The emission ends of the respective stretching fibers 21 are bundled together to be connected to an emission end element 22. The light emitted from the emission end element 22 is superimposed to radiate to the object S. The emission end element 22 is an element that allows the light emitted from each stretching fiber 21 to be superimposed to radiate to the same irradiation area, and may include a lens that collimates light (makes light not spread) or expands light.

Figure 8:
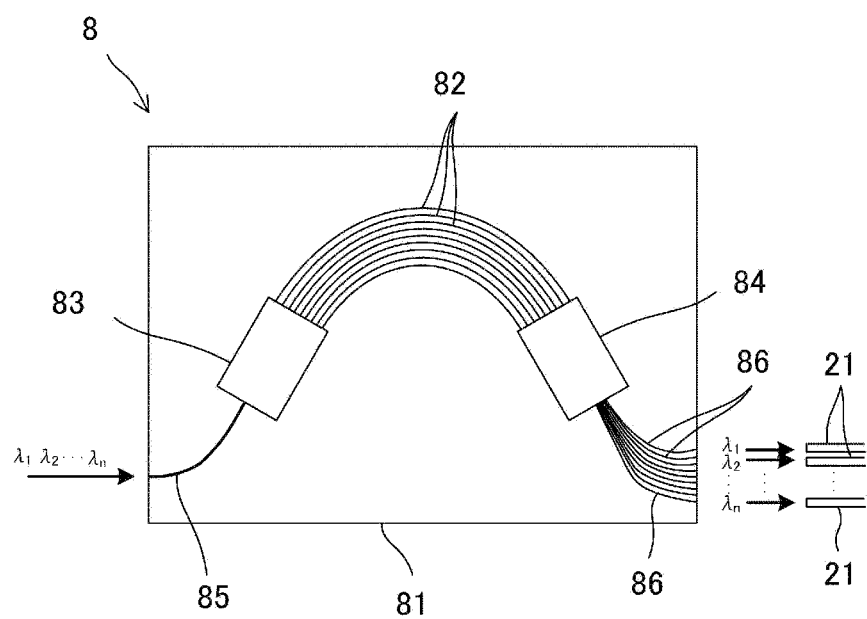
FIG. 8 is a planar schematic diagram of an array waveguide diffraction grating used as a dividing element.

FIG. 8 is a planar schematic diagram of an array waveguide diffraction grating adopted as a dividing element. Array waveguide diffraction gratings are elements developed for optical communication, and their use for spectroscopic measurement has been unknown. As shown in FIG. 8, the array waveguide diffraction grating 8 is constituted by forming functional waveguides 82 to 86 on a substrate 81. The functional waveguides include a large number of grating waveguides 82 each having an optical path length slightly different from each other, slab waveguides 83 and 84 connected to both ends (incident side and emission side) of the grating waveguides 82, an incident-side waveguide 85 that allows light to be incident onto the incident-side slab waveguide 83, and emission-side waveguides 86 that extract light with the respective wavelengths from the emission-side slab waveguide 84.

The slab waveguides 83 and 84 are free spaces, and light incident through the incident-side waveguide 85 spreads in the incident-side slab waveguide 83 and is incident onto the respective grating waveguides 82. Since each of the grating waveguides 82 has a length slightly different from each other, light reaching the end of each of the grating waveguides 82 has a phase deviated (shifted) by the difference. The light is diffracted and emitted from each grating waveguide 82, and the diffracted light passes through the emission-side slab waveguide 84 while interfering with each other and reaches the incident ends of the emission-side waveguides 86. Then, the phase shift makes the interfered light have the highest intensity at a position corresponding to the wavelength. That is, the light having different wavelengths is sequentially incident onto the respective emission-side waveguides 86, thereby spatially dispersing light. Strictly speaking, the emission-side waveguides 86 are formed such that the respective incident ends thereof are located at positions where the light is dispersed in such a manner.

Each emission-side waveguide 86 is connected to each stretching fiber 21. The pulsed light divided by wavelength is transmitted through each stretching fiber 21, and at this time, group delay occurs, thereby increasing the pulse width as a whole.

In the configuration in which the array waveguide diffraction grating 8 is used as a dividing element, pulse stretching is performed by the transmission through the stretching fiber 21, which is optimized for each wavelength, thereby providing effects of achieving uniform wavelength resolution with uniform $\Delta\lambda/\Delta t$ in the wavelengths. However, the amount of delay of light is likely to increase in the pathway via the stretching fiber 21, and thus the pulse acquisition delay T2 is likely to become longer. In other words, problems such as missed pulses and a useless data acquisition duration tend to become pronounced. Hence, the configuration in which the trigger signal is delayed in the trigger delay section 74 to reduce the influence of the pulse acquisition delay T2 provides a particular significance for a configuration in which light is divided by the array waveguide diffraction grating 8 and the divided light beams are transmitted through the respective stretching fiber 21.

In each of the embodiments described above, the trigger delay section 74 may be a delay section that is provided separately instead of the surplus section 731 of the TrADC cable 73. For example, a trigger delay section can be suitably selected from various delay elements using semiconductor devices and provided as the trigger delay section. Examples of the trigger delay section include the DS1100L series made by Maxim (Maxim Integrated, San Jose, California, USA). However, delay elements using such semiconductor devices typically have unstable delay characteristics or limited adjustment capabilities on the amount of delay. In contrast, the configuration in which the surplus section 731 is added to the TrADC cable 73 for the delay is superior and suitable in terms of high stability of the amount of delay and a high degree of freedom in changing the amount of delay.

The delay of the trigger signal is performed as the delay of an electrical signal, but it does not necessarily have to be the delay of an electrical signal; it can be the delay of other types of signals such as the delay of an optical signal. For example, a part of the output of the seed laser 110 is extracted and transmitted through a transmission fiber. The output from the transmission fiber is detected by a detector that is separately provided, and the detected output is input to an AD converter. The length of the transmission fiber is selected such that the amount of delay of the trigger signal in the transmission fiber is equal to or slightly shorter than the above-mentioned pulse acquisition delay T2. The similar result can be obtained with this configuration.

However, in the case of a transmission fiber, changing the length of the line is more troublesome than an electrical cable. That is, the fiber needs to be cut or fused to change the length, but this is troublesome because it requires treatment of the end face and readjustment of the position with the light receiver. When this is considered, it is preferable to delay the trigger signal as an electric signal. In the configuration of obtaining the trigger signal as an electrical signal, it is also possible to select the trigger signal by obtaining an output from the drive circuit of the seed laser 110 as the trigger signal. Moreover, when a pulse-oscillating excitation laser is used instead of the seed laser 110, the trigger signal can be obtained from the drive circuit thereof.

The above describes an example of the spectroscopic measurement of transmitted light from the object S, but there may be a case where the light receiver 4 is provided in a position to receive reflected light from the object S, and spectroscopic measurement of the reflected light from the object S is performed. Furthermore, there may be a case where spectroscopic measurement of the scattered light or fluorescence from the object S that is irradiated with pulsed light. In other words, the light from the object S can be transmitted light, reflected light, fluorescence, or scattered light from the object that is irradiated with pulsed light.

As the pulsed light source 1, however, an amplified spontaneous emission (ASE) light source, superluminescent diode (SLD) light source, etc. may also be employed in addition to that emitting SC light.

The present invention relates to a pulsed-light spectroscopic device that performs spectroscopic measurement using correspondence between a time and a wavelength in a pulsed light.

REFERENCE SIGNS LIST

1 Pulsed light source
11 ultrashort pulse laser
110 seed laser
111 excitation laser
12 nonlinear element
2 stretching element
21 stretching fiber
3 irradiation optical system
30 receiving plate
4 light receiver
5 calculation means
6 AD converter
7 trigger signal generator
71 beam splitter
72 detector
73 cable
731 surplus section
74 trigger delay section
8 array waveguide diffraction grating
91 reference light receiver
92 reference AD converter

The invention claimed is:
1. A pulsed-light spectroscopic device comprising:
a pulsed light source that generates a pulsed light;
a stretching element that stretches a pulse width of the pulsed light emitted from the pulsed light source to generate a stretched pulsed light in a manner that an elapsed time and a wavelength in the pulsed light corresponds to each other on a one-to-one basis;
a light receiver that receives light from an object that is irradiated with light from the stretching element;
a trigger signal generator that generates a trigger signal in response to a rise of the pulsed light; and
a trigger supply section that delays the trigger signal;
an AD converter that starts acquiring an analog signal that is output from the light receiver in response to the trigger signal that has been supplied from the trigger supply section, and that converts the analog signal into a digital signal; and
a calculation means that processes the digital signal that has been generated by the AD converter to obtain a measurement result,
wherein an amount of delay in the trigger supply section is an amount of delay such that the trigger signal is input to the AD converter prior to the rise of the pulsed analog signal that has been output from the light receiver when the object is irradiated with the stretched pulsed light associated with the pulsed light that has been used for the trigger signal generator to generate the trigger signal.

2. The pulsed-light spectroscopic device according to claim 1, wherein the pulsed light source includes an ultrashort pulse laser and a nonlinear element that causes laser light emitted from the ultrashort pulse laser to generate a nonlinear optical effect for broadening a wavelength band of the laser light, and
the trigger signal generator generates the trigger signal by extracting and detecting a part of the laser light emitted from the ultrashort pulse laser and prior to its incidence onto the nonlinear element.

3. The pulsed-light spectroscopic device according to claim 1, wherein the trigger supply section includes a trigger delay section that delays the trigger signal,
the trigger supply section includes a cable connecting the trigger signal generator to the AD converter,
the cable includes a surplus section that has a length longer than that necessary for a spatial separation between the trigger signal generator and the AD converter, and
the trigger delay section is the surplus section of the cable.

4. The pulsed-light spectroscopic device according to claim 3, further comprising a temperature control mechanism that adjusts a temperature of the surplus section.

5. The pulsed-light spectroscopic device according to claim 1, further comprising a dividing element that divides the stretched pulsed light and allows one of the divided light beams to radiate the object;
a reference light receiver disposed at a position onto which the other light beam divided by the dividing element is incident without passing through the object; and
a reference AD converter that starts acquiring an analog signal that is output from the reference light receiver and that converts the analog signal into a digital signal,
wherein the trigger supply section is configured to also supply the trigger signal to the reference AD converter, and is configured to delay the trigger signal supplied to the reference AD converter in the same manner as that supplied to the AD converter.

6. The pulsed-light spectroscopic device according to claim 5, further comprising a synchronization means that synchronizes sampling in the AD converter with sampling in the reference AD converter.

7. The pulsed-light spectroscopic device according to claim 1, wherein the stretching element includes an array waveguide diffraction grating that divides the pulsed light into a plurality of light beams corresponding to a plurality of wavelengths and a plurality of fibers that transmits the plurality of light beams that have been divided by the array waveguide diffraction grating.

8. The pulsed-light spectroscopic device according to claim 1, wherein the AD converter has a dead time that is a period of being available for acquiring a next analog signal after finishing acquiring the analog signal, and
in a repetition period of the pulsed light from the pulsed light source, an interval of the stretched pulsed light is longer than the dead time.

* * * * *